Patented Mar. 3, 1953

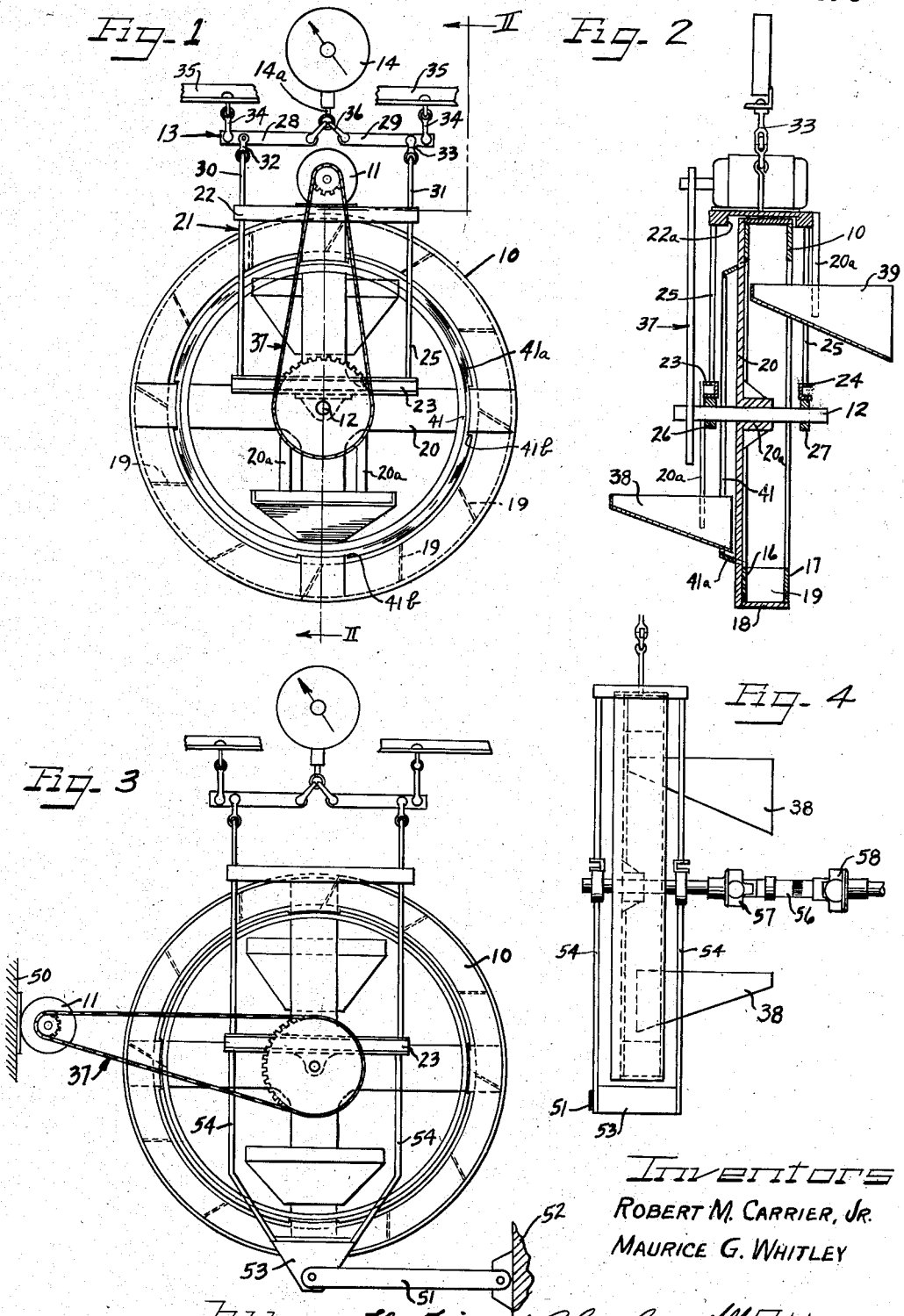

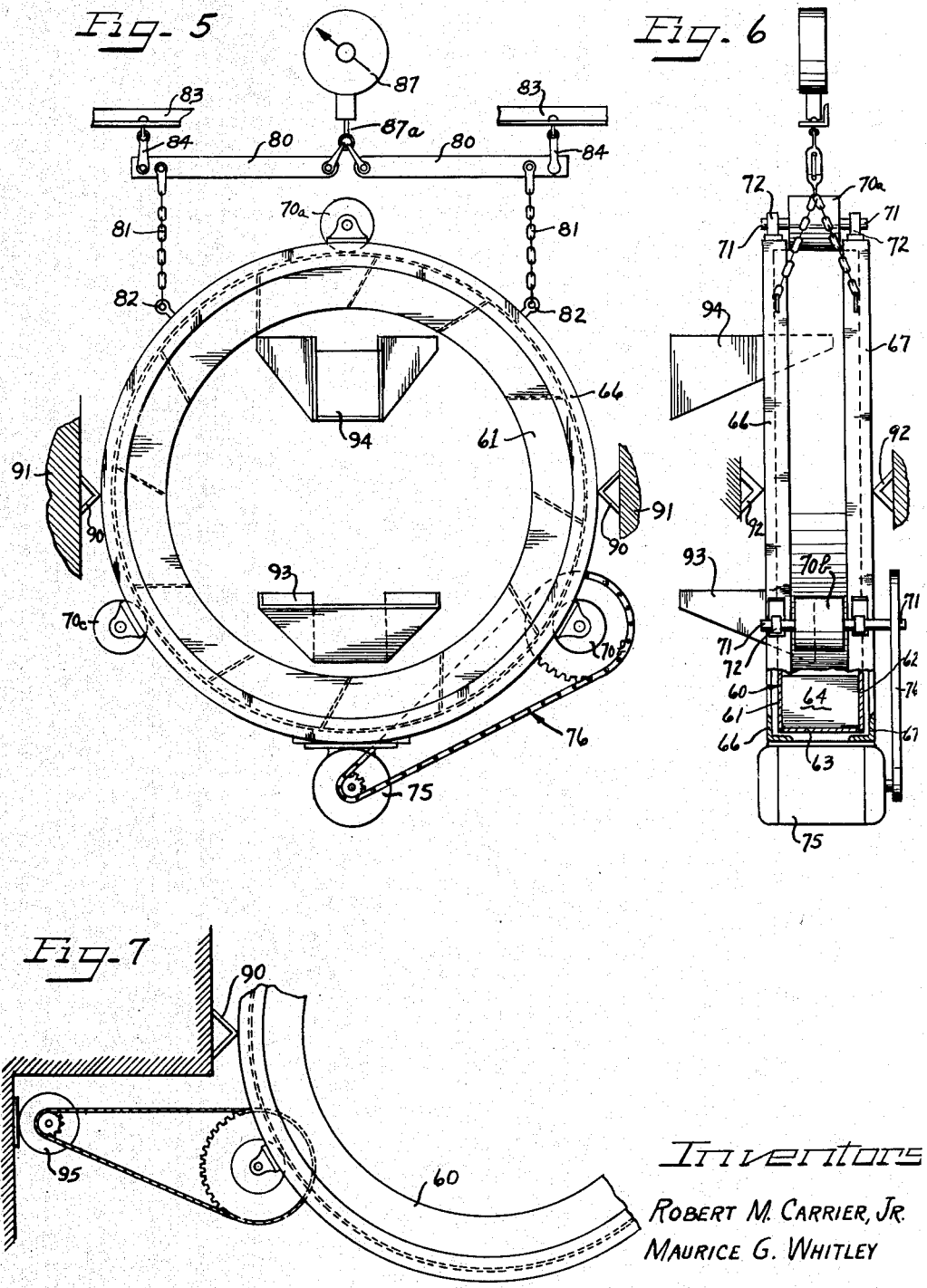

2,630,312

UNITED STATES PATENT OFFICE 2,630,312

APPARATUS FOR CONTINUOUSLY WEIGHING AGGREGATE

Robert M. Carrier, Jr., Aurora, Ill., and Maurice G. Whitley, Louisville, Ky., assignors to Carrier Conveyor Corporation, Louisville, Ky., a corporation of Kentucky Application May 15, 1947, Serial No. 748,294

7 Claims. (Cl. 265—27)

This invention relates to improvements in an apparatus for continuously weighing aggregate and more particularly to an improved apparatus for continuously weighing aggregate as it is being conveyed from one point to another.

An object of this invention is to provide an improved means for weighing aggregate as it is being conveyed upwardly to an elevated processing stage.

An important object of this invention is to provide a continuous weighing device that is readily adaptable to the automatic control of the flow or feed of a liquid or other material in proportion to the variation in weight of the material being supplied to the device.

Another object of this invention is to provide apparatus by which the weight of aggregate handled per unit time may be readily controlled even though the aggregate varies as to unit weight or bulk.

A further object of this invention is to provide apparatus through which the discharge flow rate may be maintained substantially constant.

A still further object of this invention is to provide apparatus adapted to readily indicate the rate at which material is discharged therefrom and indicate the total for any time period.

Another and further object of this invention is to provide apparatus for continuously weighing aggregate in which torque produced by a driving mechanism does not interfere with accuracy of weighing.

In accordance with the general features of this invention there is provided a rotary type conveyor, mounted to rotate in a substantially vertical plane, depending from a support structure, including a scale, in such a way that the entire weight of the conveyor, its drive mechanism and the contents of the conveyor are indicated on the scale.

A still further feature of this invention resides in the provision of a weighing apparatus which may have either a self-contained drive unit or be driven from an outside source of power.

Another feature of this invention resides in the provision of a positioning bar secured to the support structure of the conveyor and to an outside fixed member, which bar is effective to eliminate the pull on the structure caused by the torque developed by the outside power means, when such a means is used.

Other objects, features and advantages of this invention will become apparent to one skilled in the art from the following description of the embodiment illustrated in the accompanying drawings, wherein:

Figure 1 is a side elevational view of the weighing apparatus of this invention;

Figure 2 is a sectional view taken substantially on line II—II of Figure 1 looking in the direction indicated by the arrows;

Figure 3 is a side elevational view similar to Figure 1 but showing a modified drive mechanism;

Figure 4 is a side elevational view partly broken away of a second modification of the weighing apparatus of this invention;

Figure 5 is a side elevational view, partly broken away, of a modified form of the weighing apparatus of this invention;

Figure 6 is a side elevational view, partly broken away and partly in section, of the weighing apparatus of Figure 5; and Figure 7 is a fragmentary side elevational view of a modification of the weighing apparatus of Figure 5.

In a preferred embodiment of the weighing apparatus of this invention illustrated in Figures 1 and 2, the apparatus comprises a rotary conveyor wheel 10 mounted for rotation in a substantially vertical plane by a motor 11 about a central axis 12 and freely suspended from a support structure generally indicated by numeral 13 in such a way that the weight of the conveyor, its driving motor and the contents of the conveyor are indicated on a scale 14 by downward movement of the downwardly movable part 14A thereof. In operation, the scale 14 is adjusted to read zero when the conveyor is unloaded. Thereafter, any reading on the scale will indicate the weight of the material in the conveyor.

The rotary conveyor wheel 10 includes two flat angular side plates 16 and 17 enclosed by a peripheral member 18, and suitably secured thereto as by welding. A plurality of blades or shelves 19 are secured, as by welding, between the side plates 16 and 17 and the peripheral member 18. These shelves are slanted to provide pockets in which material is carried upwardly as the conveyor rotates counterclockwise as viewed in Figure 1. As the material in the pockets nears the top of the conveyor, the slope of the shelf will cause the material to slide out of the pockets and into a convenient discharge chute.

Means for rotating the conveyor wheel 10 about the axle 12 is provided by a spider or spoke construction 20 which is suitably secured at the outer end of the spokes to the annular side plates 16 and 17 and which has a central bearing portion 20a adapted to journal the axle 12 therein.

It is a feature of this invention that the entire weight of the conveyor and contents is indicated on the scale 14. This is accomplished by means of a rigid frame structure 21 which includes a platform 22 extending horizontally above the conveyor wheel 10 and having a recessed portion 22a in its lower side to permit the upper end of the conveyor to pass therethrough. Depending from the platform 22 are four rod members 25, two on either side of the conveyor. These rods support a pair of channels 23 and 24 to which are secured bearing members 26 and 27, adapted to receive the axle 12.

The platform 22 is suspended from the support structure 13, that is from the lever mechanism thereof which comprises a pair of cross arms 28 and 29 by means of rigid arms 30 and 31 and pivotable links 32 and 33. Each of the cross arms 28 and 29 has its outer end secured by pivotable links 34 to a rigid angle member 35 and has its inner end pivotally connected to the scale 14 by means of a link 36.

It is to be noted that the resisting force required of the scale, which is connected at the inner end of the arms 28 and 29 may be considerably less than the force exerted by the weight of the platform structure and the conveyor, since this weight is attached much closer to the fulcrum point. However, the reading on the scale will always be in direct proportion to the weight of the entire conveyor and support structure and therefore the dial on the scale can be calibrated to read directly in pounds of weight of the contents of the conveyor.

Means for rotating the conveyor is supplied by an electric motor 11 secured on the platform 22 and adapted to drive the axle 12 by means of a chain and sprocket drive 37.

In the embodiment shown in Figures 1 and 2, the conveyor 10 is arranged to receive aggregate at one side of the conveyor from an inlet chute 38 and to discharge it from its other side into a chute 39. These chutes 38 and 39 may be conveniently supported by any suitable support means such as arms 20a depending from the platform structure 20.

By reference to Figure 3 it will be seen that the chain 37 rotates in a counter-clockwise direction above the sprocket. Thus, the upper substantially horizontal portion of the chain creates a pull toward the left as seen in Figure 3.

However, due to the fact that this is a counter-clockwise rotation and that the lower side of the chain is in a slack condition there is no vertical component of force created by this tight upper chain. The line of pull of the tight upper chain is parallel to the resisting force created by the bar 51, therefore, with a counter-clockwise direction of rotation of the chain there is no vertical component of the force due to external drive means 11.

The applicants have found that by arranging the mechanism as disclosed in Figure 3 and operating the conveyor with no load there will be absolutely no change in the recording or reading on the scale 14 due to the operation of the drive means 11. This clearly indicates that there is no component of force in the vertical direction.

It is of course evident that the chute 38 cannot project through the rotating spokes. Therefore, there is provided an annular rim member 41 which has a slanted side 41a adapted to receive aggregate upon the inlet chute 38 and direct it through the spokes into the pockets of the conveyor. This rim, which may be conveniently welded for support to the inner end of the side plate 16, has cut out portions 41b for positioning over the spoke. For purposes of illustration the cut out portions 41b are shown with a space between the rim 41 and the spokes. However, it will be understood that these portions 41b must fit securely around the spokes to prevent loss of aggregate at this point.

To put the apparatus of Figures 1 and 2 in operation, the dial reading of the scale 14 is set to zero after all weight of the conveyor and the support mechanism is mounted thereon, to adjust for the tare. The motor 11 is set in motion for driving the conveyor 10 and aggregate is directed to the pockets of the rotary conveyor by means of the inlet chute 38. The aggregate is most conveniently brought to the inlet chute 38 from a substantially constant source of aggregate such as a supply or storage bin. As the material is deposited in the pockets of the rotary wheel and the wheel is rotated counter-clockwise it will be moved upwardly along one side of the wheel and when it gets near the top, the slant of the shelves 19 is such that the material will slide therefrom into the discharge chute 39 and be directed to a suitable work platform.

It is to be noted that the weight indicated on the scale at any instance is the weight of the aggregate actually contained on the conveyor. If then the supply of aggregate to the rotary conveyor was stopped at any instant, and the conveyor was revolved one revolution the weight of aggregate conveyed in that revolution would be the amount indicated on the scale at the beginning of the revolution. Therefore, it is seen that the weight recorded on the scale multiplied by the revolutions per minute of the wheel will give the total weight of aggregate discharge per minute.

For practical commercial purposes it will be most convenient to rotate the conveyor at a fixed speed. The scale will then be calibrated to record in weight per unit time, as tons per hour, the amount of material discharged corresponding to this fixed speed.

It is of course manifest that the weight actually in the wheel at any one time can be easily regulated by controlling the supply of aggregate to the inlet chute 38. Thus as the unit weight of the aggregate varies, the discharge in pounds per minute may be kept substantially constant by either increasing or decreasing the flow of aggregate to the wheel.

Conversely, it will be appreciated that any variation in the weight of material supplied to the wheel will be indicated by the scale. This affords an advantageous arrangement whereby the weight of an admixture may be automatically varied by a mechanism controlled from the scale according to the weight of the material supplied. Thus, the desired predetermined percentage of admixture may be held constant for variations in the weight of material supplied.

In Figure 3 is shown a modification of the weighing apparatus of this invention. In this modification the structure is exactly the same as that of Figure 1 with the exception that the motor 11 is now mounted on an outside support means 50 instead of being mounted on the platform 22. The motor again drives the rotary conveyor 10 through a chain and sprocket drive 37 in a counter-clockwise direction. As is seen in Figure 3, in rotating counter-clockwise the effective pull on the chain is in a substantially horizontal direction and this pull would cause an inaccuracy in the weight recorded on the scale. To compensate for this horizontal pull there is provided a positioning bar 51 which is pivotally secured at one end to a rigid support 52 and at the other end to a substantially horizontal cross support member 53 which extends underneath the conveyor and is supported by a plurality of downwardly extending arms 54 which depend from the angle members 23 and 24.

There is provided, therefore, in the modification shown in Figure 3, a rotary conveyor which may be driven from an outside power source and which is arranged so that the torque produced by this outside power source will not affect the accuracy of the weight recorded on the scale.

In Figure 4 is shown a second modification of the weighing apparatus of Figure 1. In this apparatus the drive for the conveyor is provided by a spline shaft 56 connected between two universal members 57 and 58. This type of drive also will cause an inaccuracy in the weight recorded on the scale due to the torque produced by the drive means and again this torque is counteracted by a bar 51 which is secured to a horizontal cross member 53 supported by rods 54 exactly as in the modification illustrated in Figure 3.

In Figure 4 is also shown an inlet chute 38 disposed on the same side as the outlet chute 39. In this case the rim member 41 which is used in Figure 1 to direct the material between the spokes is not necessary since the inlet chute can extend into the wheel on the side opposite the spokes.

In Figures 5 and 6 is shown a further embodiment of the weighing apparatus of this invention. As best seen in Figure 6, a rotary conveyor 60, including side plates 61 and 62, and a peripheral enclosing member 63 and a plurality of shelves 64 disposed between the side plates and the peripheral members, is supported between three rollers 70a, 70b and 70c for rotation inside two cover members 66 and 67 which have a substantially angular cross section. Each roller has two outwardly projecting trunnion pins 71 which are disposed in bearing members 72, rigidly secured at three substantially equiangular positions on the periphery of the casings 66 and 67. The rollers are thus adapted to contact the outer surface of the rotary conveyor 60 and to drive it frictionally through one of the rollers 70b which is driven through a suitable chain and sprocket arrangement 76 from a motor 75 mounted in inverted position across the lower end of the casings 66 and 67. The whole conveyor structure is supported from a pair of horizontal cross bars 80 by means of chains 81 which are pivotally secured at the upper end to the cross bars 80 and at the opposite end to support pins 82 secured in the casings 66 and 67, as clearly shown in Figures 5 and 6. As in the apparatus of Figure 1, the total weight of the conveyor and contents is recorded on a scale 87, the vertically movable part 87A of which is secured at the inner end of the lever mechanism comprising horizontal arms 80.

Any tendency of the conveyor to sway due to the fact that there is no central axis is provided for by a pair of stops 90 which are substantially angle members secured in a rigid support 91. One stop member 90 is disposed on either side of the conveyor. Lateral swaying is eliminated by a plurality of stops 92 disposed to bear against the sides of the casings 66 and 67.

In this embodiment aggregate is introduced to the pockets of the rotating wheels 60 at an inlet chute 93 and is received at the upper end in a discharge chute 94.

This type of conveyor wheel, which is thus mounted on the trunnion pins, does away with the need of a central axle and provides a convenient installation for many types of operation.

In Figure 7 is shown a modification of the embodiment of Figure 5. This modification shows an externally mounted motor 95 which is adapted to drive the trunnion mounted wheel 60. In this case any sideway pull due to the torque of the motor 95 will be compensated for by stop member 90 which abuts the rim of the wheel.

It will, of course, be understood that various details of construction may be varied over a wide range without departing from the principles of this invention, and it is therefore not the purpose to limit the patent granted hereon other than as necessitated by the scope of the appended claims.

We claim as our invention:

1. A weighing device comprising a supporting structure, a scale on said structure including a substantially vertically movable part which moves vertically in proportion to the downward force exerted thereon, a lever mechanism pivoted on said supporting structure equidistantly on opposite sides of said part and operatively connected in the middle to said part, a frame suspended from said lever mechanism so as to be centered under said part, a conveyor wheel carried by said frame for rotation about a substantially horizontal center axis disposed substantially vertically below said part, said wheel being formed with radially inwardly open pockets therearound, power means for rotating said wheel about such axis, means for supplying material which is to be conveyed upwardly into the pockets around the lower portion of said wheel during rotation of the latter, and means to receive the material from the pockets around the upper portion of said wheel during rotation of the latter, the weight of the material thus conveyed in the pockets of said wheel being effective through said frame and said lever mechanism to move said movable part downwardly whereby said scale indicates the weight of the conveyed material in the pockets of said wheel.

2. The device of claim 1 wherein said power means is mounted on said frame.

3. The device of claim 1 wherein said frame comprises an annular ring provided with circumferentially spaced guide rollers for said conveyor wheel, and said power means is mounted on said ring and is operative to drive one of said rollers to thus rotate said wheel.

4. The device of claim 1 wherein said means for supplying material and said means to receive the material are each fixedly mounted on said frame in vertically spaced relation.

5. The device of claim 1 wherein a fixed support separate from said frame has a bar pivotally secured thereto and to said frame to oppose rotation of said frame while permitting said frame to move vertically to actuate said part through said link mechanism.

6. A weighing device comprising a rigid support structure, a lever mechanism having a pivotal connection to said support structure, a conveyor and frame therefor entirely suspended from said lever mechanism, and a scale having a part movable vertically in proportion to the downward force thereon and connected to said lever mechanism for thus indicating the weight of said conveyor and the material therein, said conveyor comprising a drive shaft journalled in said frame, a wheel mounted for rotation with said drive shaft, fixedly mounted means for driving said wheel including a sprocket and chain drive connected to said drive shaft and a substantially horizontal bar pivotally secured at one end to said frame and at the other end to a rigid structure to counteract the torque caused by said drive means, said chain having a substantially horizontal stretch under tension tending to pull said frame to one side and said bar opposing such tendency to pull said frame.

7. A composite conveying and weighing mechanism comprising a weighing scale adapted to be fixedly supported and having a part vertically movable in proportion to the downward force thereon, a frame pendulously connected to said part of said scale and carried thereby, a conveyor wheel rotatably journaled in said frame about a horizontal axis, drive means adapted to be fixedly supported and having a flexible driving connection with said wheel to continuously rotate same, said wheel being formed with peripheral material receiving receptacles successively upwardly and downwardly open as said wheel rotates to respectively receive and elevate selected quantities of a conveyable material in the receptacles when upwardly open and to discharge the material therefrom when downwardly open, an inlet and an outlet for said conveyor wheel fixedly mounted relative to said frame and spaced apart vertically from each other and arranged to cooperate with said receptacles as said wheel rotates and a bar adapted to be pivotally connected to a rigid support at one end and pivotally connected to said frame at the other end, said bar arranged to counteract torque forces imparted to said frame by said drive means, the weight of the material thus elevated in the receptacles of said wheel being effective through said frame to actuate said weighing scale.

ROBERT M. CARRIER, Jr.
MAURICE G. WHITLEY.

REFERENCES CITED

The following references are of record in the file of this patent:

UNITED STATES PATENTS

| Number | Name | Date |
|---|---|---|
| 706,565 | James | Aug. 12, 1902 |
| 945,636 | Svenson | Jan. 4, 1910 |
| 1,034,013 | Hebden | July 30, 1912 |
| 1,093,673 | Wilson | Apr. 21, 1914 |
| 1,186,218 | Merrick | June 6, 1916 |
| 1,615,485 | Rees | Jan. 25, 1927 |
| 1,617,301 | Reddick et al. | Feb. 8, 1927 |
| 1,717,564 | Ihlefeldt | June 18, 1929 |
| 1,729,414 | Biehler | Sept. 24, 1929 |
| 1,755,154 | Smith et al. | Apr. 15, 1930 |
| 1,971,807 | Bates et al. | Aug. 28, 1934 |
| 2,219,863 | Cronk | Oct. 29, 1940 |
| 2,227,067 | Cronk | Dec. 31, 1940 |
| 2,232,431 | Bilocq | Feb. 18, 1941 |
| 2,427,190 | Bradley et al. | Sept. 9, 1947 |

FOREIGN PATENTS

| Number | Country | Date |
|---|---|---|
| 315,122 | Great Britain | July 11, 1929 |